United States Patent
Farmer

(10) Patent No.: US 6,662,093 B2
(45) Date of Patent: *Dec. 9, 2003

(54) IMAGE PROCESSING SYSTEM FOR DETECTING WHEN AN AIRBAG SHOULD BE DEPLOYED

(75) Inventor: Michael Edward Farmer, West Bloomfield, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/052,152

(22) Filed: Jan. 17, 2002

(65) Prior Publication Data

US 2003/0040859 A1 Feb. 27, 2003

Related U.S. Application Data

(63) Continuation-in-part of application No. 10/023,787, filed on Dec. 17, 2001, and a continuation-in-part of application No. 10/006,564, filed on Nov. 5, 2001, now Pat. No. 6,577,936, and a continuation-in-part of application No. 09/901,805, filed on Jul. 10, 2001, and a continuation-in-part of application No. 09/870,151, filed on May 30, 2001.

(51) Int. Cl.[7] .............................................. B60R 22/00
(52) U.S. Cl. ........................... 701/45; 701/47; 180/268; 180/271; 382/103; 382/104; 382/106; 280/735; 340/438
(58) Field of Search ............................. 701/28, 45, 47; 180/268, 271; 280/735; 340/438; 382/103, 104, 106

(56) References Cited

U.S. PATENT DOCUMENTS

| | | |
|---|---|---|
| 4,179,696 A | 12/1979 | Quesinberry et al. |
| 4,625,329 A | 11/1986 | Ishikawa et al. |
| 4,985,835 A | 1/1991 | Sterler et al. |
| 5,051,751 A | 9/1991 | Gray |
| 5,074,583 A | 12/1991 | Fujita et al. |
| 5,229,943 A | 7/1993 | Eigler et al. |
| 5,256,904 A | 10/1993 | Tohbaru |
| 5,366,241 A | 11/1994 | Kithil |

(List continued on next page.)

FOREIGN PATENT DOCUMENTS

| | | |
|---|---|---|
| GB | 2 236 419 A | 4/1991 |
| JP | 61-66905 | 6/1994 |
| JP | 61-66906 | 6/1994 |
| WO | WO02/30717 | 4/2002 |

OTHER PUBLICATIONS

Greg Welch and Gary Bishop, "An Introduction to the Kalman Filter", Sep. 4, 1997.

Primary Examiner—William A. Cuchlinski, Jr.
Assistant Examiner—McDieunel Marc
(74) Attorney, Agent, or Firm—Rader, Fishman & Grauer PLLC

(57) ABSTRACT

The invention can determine whether a collision has occurred, whether an airbag should be deployed, and what the desirable strength of an airbag deployment should be based on occupant characteristics obtained from the segmented image of the occupant. Using interacting multiple model Kalman filters, the invention can infer three-dimensional characteristics from a two-dimensional image, and predict the location, velocity, and acceleration of the occupant. Kalman filters are used with respect to all measurements to incorporate past predictions and measurements into the most recent estimates and predictions in order to eliminate the "noise" associated with any particular measurement. The system can predict the position and shape of the occupant at a faster rate than the rate at which the sensor collects data. Occupant characteristics can be compared to corresponding predetermined data associated with various occupant modes, including the mode of crashing, to determine if a collision has occurred.

35 Claims, 7 Drawing Sheets

U.S. PATENT DOCUMENTS

| | | |
|---|---|---|
| 5,398,185 A | 3/1995 | Omura |
| 5,413,378 A | 5/1995 | Steffens, Jr. et al. |
| 5,446,661 A | 8/1995 | Gioutsos et al. |
| 5,490,069 A | 2/1996 | Gioutsos et al. |
| 5,673,365 A * | 9/1997 | Basehore et al. .............. 706/46 |
| 5,890,085 A | 3/1999 | Corrado et al. |
| 5,967,549 A * | 10/1999 | Allen et al. ................. 280/735 |
| 5,983,147 A | 11/1999 | Krumm |
| 6,005,958 A | 12/1999 | Farmer et al. |
| 6,018,693 A | 1/2000 | Blackburn et al. |
| 6,026,340 A | 2/2000 | Corrado et al. |
| 6,198,998 B1 * | 3/2001 | Farmer et al. ................ 701/45 |
| 6,272,411 B1 | 8/2001 | Corrado et al. |

* cited by examiner

| Major | Minor | Width |
|-------|-------|-------|
| Input | Input | Output |
| Input | Input | Output |
| Input | Input | Output |
| Input | Input | Output |
| Input | Input | Output |

Fig. 11a

| Major | Minor | Volume |
|-------|-------|--------|
| Input | Input | Output |
| Input | Input | Output |
| Input | Input | Output |
| Input | Input | Output |
| Input | Input | Output |

Fig. 11b

| Major | Minor | Mass |
|-------|-------|------|
| Input | Input | Output |
| Input | Input | Output |
| Input | Input | Output |
| Input | Input | Output |
| Input | Input | Output |

Fig. 11c

IMAGE PROCESSING SYSTEM FOR DETECTING WHEN AN AIRBAG SHOULD BE DEPLOYED

RELATED APPLICATIONS

This Continuation-In-Part application claims the benefit of the following U.S. utility applications: "A RULES-BASED OCCUPANT CLASSIFICATION SYSTEM FOR AIRBAG DEPLOYMENT," Ser. No. 09/870,151, filed on May 30, 2001, now U.S. Pat. No. 6,459,974; "IMAGE PROCESSING SYSTEM FOR DYNAMIC SUPPRESSION OF AIRBAGS USING MULTIPLE MODEL LIKELIHOODS TO INFER THREE DIMENSIONAL INFORMATION," Ser. No. 09/901,805, filed on Jul. 10, 2001; "IMAGE PROCESSING SYSTEM FOR ESTIMATING THE ENERGY TRANSFER OF AN OCCUPANT INTO AN AIRBAG," Ser. No. 10/006,564, filed on Nov. 5, 2001, now U.S. Pat. No. 6,577,936; and "IMAGE SEGMENTATION SYSTEM AND METHOD," Ser. No. 10/023,787, filed on Dec. 17, 2001, the contents of which are hereby by incorporated by reference in their entirety.

BACKGROUND OF THE INVENTION

The present invention relates in general to systems or methods used to determine when an airbag should be deployed to protect an occupant in a vehicle from the impact of a collision. In particular, the present invention relates to inferring three-dimensional occupant characteristics from a two-dimensional segmented image of the occupant, and determining when an airbag should be deployed using those occupant characteristics in an iterative and probability-weighted manner to determine if a vehicle collision has occurred.

Conventional collision detection systems typically use accelerometers or weight-based sensors to determine if there has been a vehicle collision to trigger the deployment of an airbag. Such systems are subject to false alarms from severe road conditions, such as a vehicle sliding on ice the bumps into a curb, and minor impacts, such as the accidental hitting of a parking block while entering a parking lot. It would be desirable for an airbag deployment system to be based on occupant characteristics derived from an image of the occupant because the image of an occupant is less susceptible to errors caused by rapidly shifting movement or weight.

Even prior art systems that do not rely solely on weight-based determinations are susceptible to errors due to "noise" because such systems focus solely on the most recent measurement or sensor input, and ignore the series of measurements or inputs captured mere fractions of a second earlier. Measurement "noise" results from several factors, including the inherent imperfections of capturing sensor inputs. It would be desirable for an image processing system or an airbag deployment system to utilize an iterative process that would integrate the information contained in the most recent image into a comprehensive framework that includes prior predictions and indirectly, the prior images used to make those prior predictions. It may also be desirable for some or all predictions to be probability-weighted predictions and for such weighted predictions to incorporate probabilities associated with predefined occupant states such as leaning left towards the driver, leaning right away from the driver, or sitting upright. It may also be desirable for a system to incorporate predefined occupant modes such as crashing, pre-crash braking, stationary (asleep), or human (normal).

Existing camera-based and image-based systems are typically limited by the fact that they rely on two-dimensional sensor readings. The images captured by cameras, including video cameras, are inherently two-dimensional images. However, some important characteristics such as volume (which can be used to calculate mass) are three-dimensional. It would be beneficial if three-dimensional information could be inferred from a series of two-dimensional images taken by a single fixed video camera. Moreover, it would be helpful if predefined occupant states and modes were incorporated into the iterative process of deriving a three-dimensional information from a series of two-dimensional images.

Conventional airbag deployment systems have contributed significantly to the safety of occupants in automobile crashes. However, there may be occasions when deployment of an airbag is not desirable in the context of a vehicle collision. A collision of minimal impact may not merit the deployment of an airbag, especially if the occupant is wearing a seat belt. Moreover, the close proximity of an occupant to the deploying airbag may make airbag deployment undesirable in a particular situation. It would be desirable for an airbag deployment system to track and predict the location of an occupant so that the airbag deployment system can be disabled in situations where the occupant would be too close to the airbag deployment system.

Conventional airbag deployment systems tend to take an all or nothing approach with respect to airbag deployment. Under such approaches, an airbag is either fully disabled or is deployed at full strength. A total disablement of the airbag precludes the occupant from receiving any benefits of an airbag, a generally useful safety device. A full strength deployment of an airbag may subject the occupant to undesirable force in a low speed crash. It would be desirable if an airbag deployment system could be deployed at various different strengths depending on the impact of the occupant and the airbag. It would be desirable if metrics such as kinetic energy, momentum, or other measurements utilizing the characteristics of mass and velocity were used to determine the magnitude of impact that an airbag needs to absorb from the impacting occupant. As discussed above, current methods for determining occupant characteristics such as mass, velocity, location, and other characteristics suffer from significant limitations in the existing art.

SUMMARY OF THE INVENTION

This invention relates to an image processing system used to determine whether a vehicle has been subjected to a collision requiring the deployment of an airbag. The invention uses a tracking and predicting subsystem to incorporate past sensor readings and predictions along with a current sensor reading to generate one or more occupant characteristics relevant to a crash determination. In a preferred embodiment, the system uses mathematical heuristics such as a Kalman filter to track and predict occupant characteristics, and such heuristics can be applied to interacting multiple models in a probability-weighted fashion. A crash detection subsystem processes one or more occupant characteristics from the tracking and predicting subsystem to determine whether a crash has occurred. A preferred method of crash detection is for the crash detection subsystem to compare an occupant characteristic with an appropriate metric relating to one of the various models, and determine which of the models (which includes crash model) best describes the occupant characteristic.

The invention can include an ellipse fitting subsystem for generating an ellipse to represent the upper torso of the occupant. That ellipse can then be used by the system to generate occupant characteristics for the tracking and predicting subsystem. In situations where a crash is detected, an at-risk-zone subsystem can be used to determine if the occupant is too close to the airbag for the airbag to safely deploy. If an occupant is not within the at-risk-zone, an impact assessment subsystem can be used to determine the impact that the airbag needs to absorb for a particular deployment so that the airbag can be set to deploy at the appropriate strength. In a preferred embodiment, the deployment strength of the airbag is set to absorb the kinetic energy of the occupant impacting into the airbag.

Various aspects of this invention will become apparent to those skilled in the art from the following detailed description of the preferred embodiment, when read in light of the accompanying drawings.

BRIEF DESCRIPTION OF THE DRAWINGS

FIG. 11a shows a "look-up" table where the width of the upper ellipse is determined by using the major axis and minor axis of the upper ellipse as inputs.

FIG. 11b shows a "look-up" table where the volume of the upper ellipse is determined by using the major axis and minor axis of the upper ellipse as inputs.

FIG. 11c shows a "look-up" table where the mass of the upper ellipse is determined by using the major axis and minor axis of the upper ellipse as inputs.

DETAILED DESCRIPTION OF THE PREFERRED EMBODIMENT

A. Partial View of Surrounding Environment

Figure 1:
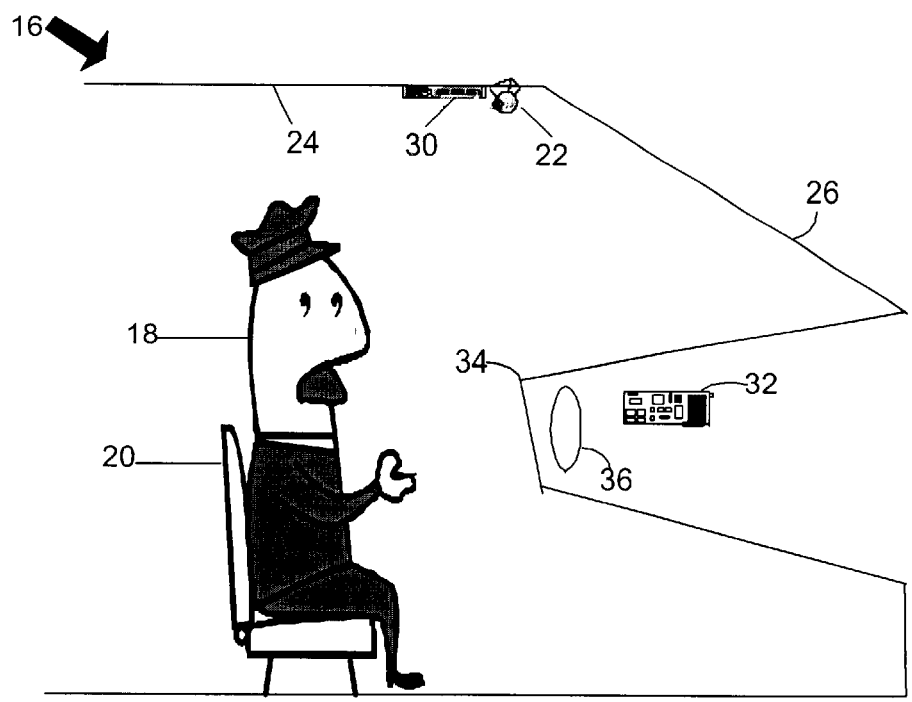
FIG. 1 shows a partial view of the surrounding environment for one potential embodiment of the invention.

Referring now to the drawings, illustrated in FIG. 1 is a partial view of the surrounding environment for one potential embodiment of the invention, an image processing system 16. If an occupant 18 is present, the occupant 18 sits on a seat 20. In a preferred embodiment, a camera or other imaging sensor 22 (collectively "camera") capable of rapidly capturing a series of images is attached in a roof liner 24, above the occupant 18 and in a position closer to a front windshield 26 than the occupant 18. The camera 22 could be a standard video camera, but for crash detection purposes, a high speed camera 22 capable of capturing between 250 and 1000 frames per second would be preferable. The camera 22 should preferably be placed in a slightly downward angle towards the occupant 18 in order to capture changes in the angle and position of the occupant's 18 upper torso resulting from forward or backward movement in the seat 20. There are many other potential locations for a camera 22 that are well known in the art. Similarly, a computer 30 could be located virtually anywhere on a vehicle. In a preferred embodiment, the computer 30 is located near the camera 22 to avoid sending camera images through long wires. An airbag controller 32 is shown in an instrument panel 34, although the airbag controller could be located virtually anywhere in the vehicle. An airbag deployment system 36 is shown in the instrument panel 34 in front of the occupant 18 and the seat 20, although the system 16 can function with the airbag deployment system 36 in alternative locations.

B. High Level Process Flow

Figure 2:
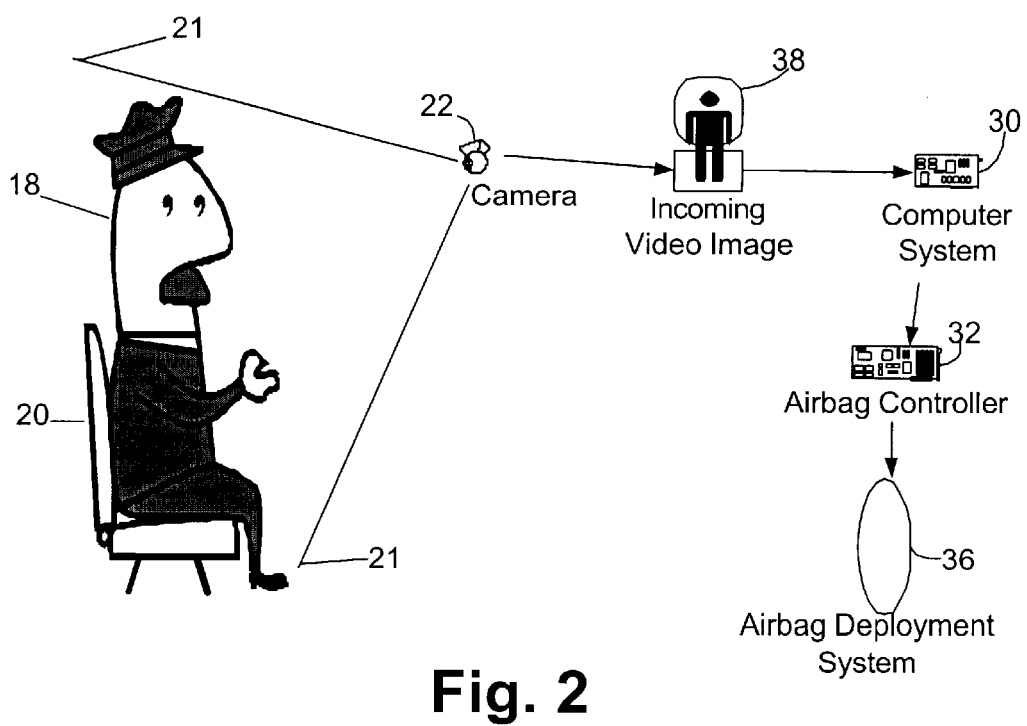
FIG. 2 shows a high-level process flow of the image processing system.

FIG. 2 discloses a high-level process flow relating to the use of the image processing system 16. An incoming video image ("ambient image") 38 of a seat area 21 includes both the occupant 18 and images in the seat area 21 that surround the occupant 18.

The incoming video image 38 is captured by the camera 22 or any other sensor capable of rapidly capturing a series of images. In the Figure, the seat area 21 includes the entire occupant 18, although under some circumstances and embodiments, only a portion of the occupant's 18 image will be captured, particularly if the camera 22 is positioned in a location where the lower extremities may not be viewable. The ambient image 38 is sent to the computer 30.

As described in greater detail below, the system 16 can derive a segmented image from the ambient image 38. The segmented image is the image of the occupant 18 in isolation from the surrounding seat area 21. The system 16 can capture a series of measurements and perform a series of calculations to generate one or more occupant characteristics. The occupant characteristics can then be used by the system 16 to determine, (a) whether a collision has occurred; (b) whether the collision merits the deployment of an airbag 36; (c) whether the occupant 18 is within an at-risk-zone such that deployment of the airbag 36 is not desirable; and (d) what the appropriate deployment strength of the airbag 36 should be. Depending on the results of the processing performed by the computer 30, the appropriate instructions can be sent to the airbag controller 32 for implementation by the airbag deployment system 36.

C. Computer System Process Flow

Figure 3:
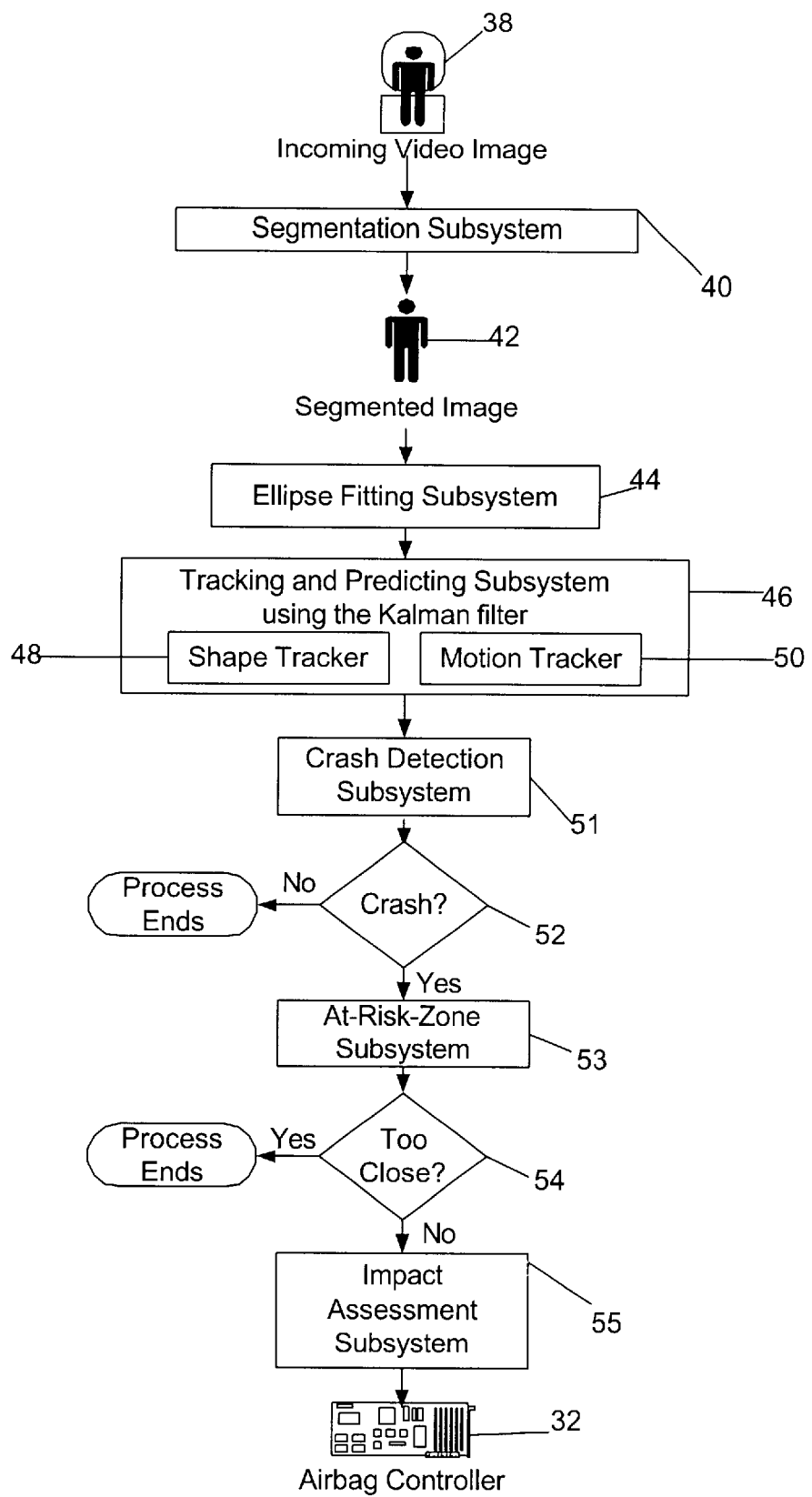
FIG. 3 shows a high-level block diagram of an image processing system including some optional subsystems.

FIG. 3 gives a high level process flow as to the processing performed by the computer 30 in the various embodiments of the system 16. In a preferred embodiment, the ambient image 38 of the occupant 18 and surrounding seat area 21 is inputted to the computer 30 from the camera 22 or sensor. A segmentation subsystem 40 preferably extracts a segmented image 42 of the occupant 18 (an image 42 which includes only the occupant 18 and not the surrounding seat area 21) from the ambient image 38. Various segmentation processes 40 are known under existing art, and the system 16 can preferably invoke different segmentation processes 40 depending on the current lighting and other environmental conditions surrounding the occupant 18. Segmentation 40 is accomplished electronically through the use of software, and thus in alternative embodiments of the invention, segmentation could be performed in a computer that is separate from the computer 30.

The segmented image 42 of the occupant 18 can then be processed by an ellipse fitting subsystem 44. An upper ellipse can be fitted around the upper torso of the occupant 18, and the system 16 preferably uses the upper ellipse to track and predict occupant 18 characteristics. The upper torso includes everything from the head of the occupant 18 down to the hips of the occupant 18. A lower ellipse can be fitted from the toes of the occupant 18 up to the hips of the occupant 18. The lower ellipse is a less desirable representation of the occupant 18 because a deploying airbag 36 does not typically impact the areas of the occupant 18 represented by the lower ellipse (especially if a seat belt is worn). In a preferred embodiment, a centroid of the upper ellipse is one measurement used to represent occupant motion characteristics of the occupant 18. The output of the ellipse fitting routine 44 will be discussed in greater detail below along with the discussion relating to FIGS. 4, 5, and 6. The processes and practices of generating an upper ellipse, a lower ellipse, and a centroid to represent different parts of the occupant 18 are known in the art. In a preferred embodiment of the invention, the ellipse fitting routine 44 is applied by the computer 30, but in alternative embodiments, the ellipse fitting subsystem 44 could be performed by a computer that is separate from but connected to the computer 30. Alternative embodiments could also utilize a different geometric shape than an ellipse, such as a rectangle, circle, point, or other geometric shape. Alternative embodiments can also forgo the use of a geometric shapes to represent the occupant 18 and instead utilize measurements directly from the segmented image 42.

Information relating to the upper ellipse, lower ellipse, and centroid can then be sent to a tracking and predicting subsystem 46. The tracking and predicting subsystem 46 applies distinct sub-processes simultaneously with each other. A shape tracker 48 tracks and predicts variables relating to the "shape" of the upper ellipse. This process is described in greater detail below in the discussion relating to FIG. 9. A motion tracker 50 tracks and predicts variables relating to the "motion" of the upper ellipse, specifically with respect the horizontal distance between the occupant 18 and the airbag deployment system 36 in the instrument panel 34. This process is described in greater detail below in the discussion relating to FIG. 10.

The system 16 can use the tracking and predicting subsystem 46 to track and predict the position, velocity, and acceleration of certain key measurements relating to shape and motion of the upper torso of the occupant 18 using multiple occupant models (multiple states and modes) and iterative processes. The use of iterative processes allows the system 16 to incorporate the latest measurement into a series of ongoing measurements and predictions. In a preferred embodiment, the tracking and predicting subsystem 46 incorporates what is known in the prior art as a Kalman filter. A Kalman filter is very powerful in that it incorporates past predictions and measurements in a weighted fashion, supports estimations of past, present, and even future states. A Kalman filter can be used effectively even when the precise nature of the modeled system is unknown.

An academic paper entitled "An Introduction to the Kalman Filter" by Greg Welch and Gary Bishop is incorporated by reference. The general equation for the Kalman filter is shown in Equation 1:

$$X_{(new\ estimate)} = X_{(old\ prediction)} + \text{Gain}[-X_{(old\ prediction)} + X_{(measured)}]$$

In a Kalman filter, "Gain" represents the perceived accuracy of the most recent measurement. A Gain of 0 indicates such a poor measurement that it is of no value, and thus the new estimate $X_{(new\ estimate)}$ is simply the value of the old estimate $X_{(old\ prediction)}$.

Equation 2:

$$X_{(new\ estimate)} = X_{(old\ prediction)} + 0[-X_{(old\ prediction)} + X_{(measured)}]$$
$$X_{(new\ estimate)} = X_{(old\ prediction)} + 0$$
$$X_{(new\ estimate)} = X_{(old\ prediction)}$$

A Gain of 1 indicates such confidence in the most recent measurement $X_{(measured)}$ that the new prediction $X_{(new\ estimate)}$ is simply the value of the most recent measurement $X_{(measured)}$.

Equation 3:

$$X_{(new\ estimate)} = X_{(old\ estimate)} + 1[-X_{(old\ estimate)} + X_{(measured)}]$$
$$X_{(new\ estimate)} = X_{(old\ estimate)} - X_{(old\ estimate)} + X_{(measured)}]$$
$$X_{(new\ estimate)} = X_{(measured)}$$

In a real world application, the Gain is virtually always greater than 0 and less than 1. The Gain thus determines to what degree a new measurement can change the previous aggregate estimate or prediction of the location of an object. In the case of the system 16, the occupant 18 or the upper ellipse representing the occupant 18, is the object being tracked. Both the shape tracker 48 and the motion tracker 50 are described in greater detail below, along with FIGS. 9 and 10 respectively.

The outputs from both the shape tracker 48 and the motion tracker 50 can be used by a crash detection subsystem 51. The crash detection subsystem 51 makes a crash determination for the system 16 incorporating the occupant 18 characteristics calculated by the shape tracker and predictor 48 and the motion tracker and predictor 50. The crash detection subsystem 51 can determine the complete motion model of the occupant 18, including the position, velocity, and acceleration of the occupant 18, in addition to the motion mode of the occupant 18. Motion modes and the crash detection subsystem 51 are described in greater detail below.

If a crash is not detected at 52, the current loop of processing ends. The next loop may or may not begin with a new ambient image 38 because in a preferred embodiment, the tracking and predicting subsystem 46 can generate predictions faster than the camera 22 can capture sensor readings. Thus, the beginning of a new loop can begin either with a new ambient image 38 or with a new prediction at 46. If a crash is detected at 52, and the tracking and predicting subsystem 46 indicates that an occupant 18 is present, an at-risk-zone subsystem 53 can be invoked. The at-risk-zone subsystem 53 determines whether or not the occupant 18 will be too close to the airbag 36 at the time of deployment such that it would be better for the airbag 36 not to deploy. The at-risk-zone subsystem 53 is described in greater detail below.

If the occupant 18 is within the at-risk-zone, the process loop can end (without deployment of the airbag 36, and a new process loop can begin either with a new ambient image 38 or with updated predictions from the tracking and predicting subsystem 46. If the occupant 18 is not within the at-risk-zone at 54, then the system 16 can invoke the impact assessment subsystem 55 to determine the appropriate deployment strength of the airbag 36. In a preferred embodiment, the deployment strength of the airbag 36 is determined by calculating the kinetic energy that the airbag 36 needs to absorb at the moment that the airbag 36 impacts with the occupant 18.

Equation 4

$$Kinetic\ Energy = \tfrac{1}{2} * Mass * Velocity^2$$

As described in greater detail below, the mass of the occupant 18 is calculated by using the volume of the occupant 18 and the density of the occupant 18.

Equation 5

$$Mass = Volume * Density$$

The impact metric calculations can be computed more frequently than the camera 22 can collect sensor readings. The impact assessment subsystem 55 is discussed in greater detail below.

All relevant information can then be sent to the airbag controller 32, indicating that the airbag 36 should either: (a) not deploy; (b) deploy at full strength; or (c) deploy at less than full strength (for example, 75%, 50%, or 25%). The various subsystems in FIG. 3 are described in greater detail below.

D. Ellipse Fitting Subsystem

Figure 4:
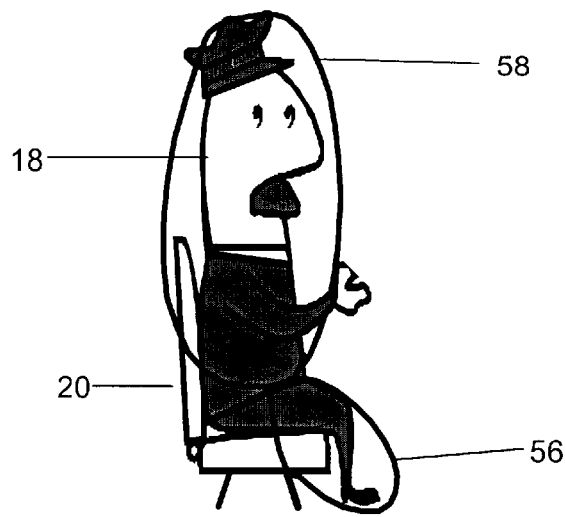
FIG. 4 shows the results of an ellipse fitting routing as performed by the ellipse fitting subsystem.

FIG. 4 illustrates an ellipse fitting routine that can be implemented by the ellipse fitting subsystem 44. In a preferred embodiment, the ellipse fitting subsystem 44 is software in the computer 30, but in alternative embodiments, the ellipse fitting subsystem 44 could be housed in a different computer or device.

The upper ellipse 58 preferably extends from the hips up to the head of the occupant 18. The lower ellipse 56 preferably extends down from the hips to include the feet of the occupant 18. If the entire area from an occupant's 18 hips down to the occupant's 18 feet is not visible, the lower ellipse 56 can be generated to represent what is visible. In a preferred embodiment, the lower ellipse 56 is not used by the system 16 and thus need not be generated by the system 16. Many characteristics of an ellipse can be tracked by the system 16 using a single point on the ellipse, preferably the centroid of the ellipse. In alternative embodiments, shapes other than ellipses can be used to represent the upper and lower parts of an occupant 18. Ellipse fitting routines are known in the art.

Figure 5:
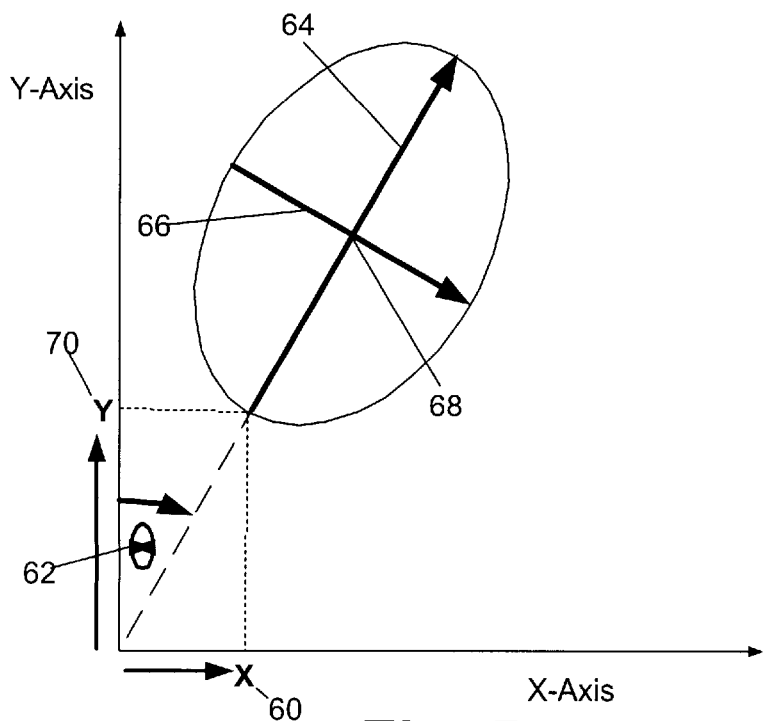
FIG. 5 shows an upper torso ellipse with some corresponding shape variables and motion variables (velocity and acceleration derivations of those shape variables are not visible).

FIG. 5 illustrates many of the characteristics that can be outputted from the ellipse fitting subsystem 44 for use by the system 16. A centroid 68 of the upper ellipse 58 can be identified by the system 16 for tracking characteristics of the occupant 18. It is known in the art how to identify the centroid 68 of an ellipse. Motion characteristics include an x-coordinate ("distance") 60 of the centroid 68 and a forward tilt angle ("θ") 62. Shape measurements include a y-coordinate ("height") 70 of the centroid 68, a length of the major axis of the ellipse ("major") 64 and a length of the minor axis of the ellipse ("minor") 66. Alternative embodiments may utilize a wide variety of different occupant characteristics or ellipse attributes. Rate of change information and other mathematical derivations, such as velocity (single derivatives) and acceleration (double derivatives), are preferably captured for all shape and motion measurements, so in the preferred embodiment of the invention there are nine shape characteristics (height, height, height, major, major, major, minor, minor, and minor) and six motion characteristics (distance, distance, distance, θ, θ', and θ"). A sideways tilt angle Φ is not shown because it is perpendicular to the image plane, and this the sideways title angle Φ is derived, not measured, as discussed in greater detail below. Motion and shape characteristics are used to calculate the volume, and ultimately the mass, of the occupant 18, so that the kinetic energy of the occupant 18 can be determined. Alternative embodiments may incorporate a greater number or a lesser number of occupant 18 characteristics.

Figure 6:
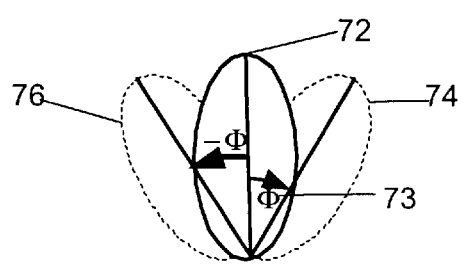
FIG. 6 shows an embodiment with three potential shape states and three potential sideways tilt angles.

FIG. 6 illustrates the sideways tilt angle "(Φ)" 73. In a preferred embodiment of the invention, there are three shape states, leaning left towards the driver (left) 76, sitting upright (center) 72, and leaning right away from the driver (right) 74, with tilt sideways tilt angles of –Φ, 0, and Φ. In a preferred embodiment, Φ is set at a value between 15 and 40 degrees, depending on the nature of the vehicle being used. Alternative embodiments may incorporate a different number of shape states, and a different range of sideways tilt angles 73.

E. Markov Probability Chains

The system 16 can incorporate a multiple-model probability weighted implementation of multiple Kalman filters. In a preferred embodiment, a different Kalman filter will be applied to motion characteristics than the Kalman filter applied to shape characteristics. Moreover, it is preferable for each individual shape characteristic to have a separate Kalman filter for each shape state supported by the system 16. Similarly, it is preferable for each individual motion characteristic to have a separate Kalman filter for each motion mode supported by the system 16. There are certain predefined probabilities associated with a transition from one state to another state and from one mode to another mode. These probabilities can be illustrated through the use of Markov chains. The system 16 is flexible, and can support a wide range of different probability values for a wide range of different modes and states. A user of the system 16 is free to set their own probability values into the variables disclosed in the Markov chains, and described in greater detail below. This maximizes the flexibility of the system 16 with respect to different embodiments and different operating environments.

Figure 7:
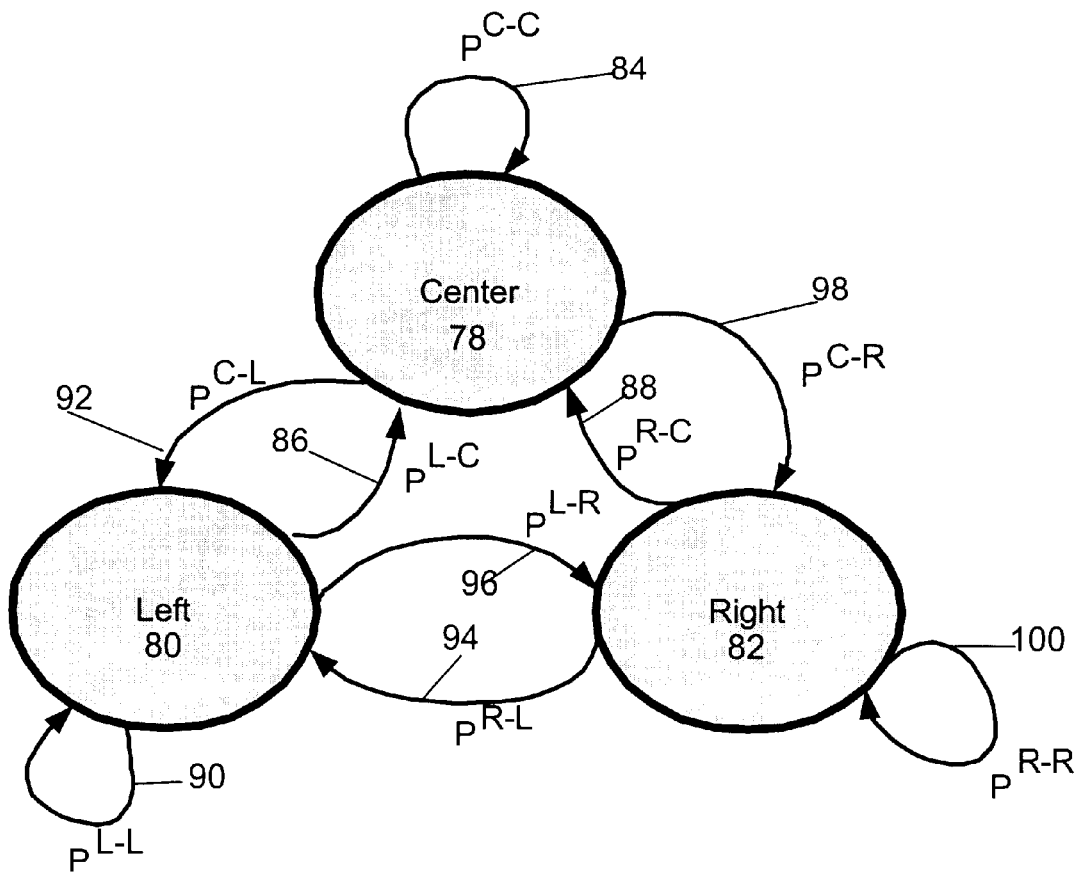
FIG. 7 shows a Markov chain of probabilities relating to a three shape state embodiment including left, right, and center states.

FIG. 7 illustrates the three shape states used in a preferred embodiment of the invention. In a preferred embodiment, an occupant 18 is either leaning towards the driver ("left") 80, sitting upright ("center") 78, or leaning away from the driver ("right") 82. The probability of an occupant 18 being in a particular state and then ending in a particular state can be identified by lines originating at a particular shape state with arrows pointing towards the subsequent shape state. For example, the probability of an occupant in center state remaining in center state $P^{C-C}$ is represented by the arrow at 84. The probability of moving from center to left $P^{C-L}$ is represented by the arrow 92 and the probability of moving from center to right $P^{C-R}$ is 98. The total probabilities resulting from an initial state of center 78 must add up to 1.

Equation 6

$$P^{C-C} + P^{C-L} + P^{C-R} = 1.0$$

Similarly, all of the probabilities originating from any particular state must also add up to 1.0.

The arrow at 86 represents the probability ($P^{L-C}$) that a left tilting occupant 18 will sit centered by the next interval of time. Similarly, the arrow at 96 represents the probability ($P^{L-R}$) that a left tilting occupant will tilt right by the next interval of time, and the arrow at 90 represents the probability ($P^{L-L}$) that a left tilting occupant will remain tilting to the left. The sum of all possible probabilities originating from an initial tilt state of left must equal 1.

Equation 7

$$P^{L-C}+P^{L-L}+P^{L-R}=1.0$$

Lastly, the arrow at 100 represents the probability that a right tilting occupant will remain tilting to the right $P^{R-R}$, the arrow at 88 represents the probability that a right tilting occupant will enter a centered state $P^{R-C}$, and the arrow at 94 represents the probability that an occupant will tilt towards the left $P^{R-L}$. The sum of all possible probabilities originating from an initial tilt state of right equals 1.

Equation 8

$$P^{R-C}+P^{R-L}+P^{R-R}=1.0$$

As a practical matter, the typical video camera 22 captures between 50 to 100 frames each second (a preferred high speed video camera 22 captures between 250 to 1000 frames each second). Thus, it is essentially impossible for a left 80 leaning occupant to become a right 82 leaning occupant, or for a right 82 leaning occupant to become a left 80 leaning occupant, without first transitioning to the state of "centered." It is far more likely that a left 80 leaning occupant will first enter a center state 78 before becoming a right 82 leaning occupant, and similarly, it is far more realistic for a left 80 leaning occupant to become a centered 78 occupant before becoming a right 82 leaning occupant. Thus, $P^{L-R}$ at 96 should be set at a low number close to but not equal to zero and $P^{R-L}$ at 94 should be set at a low number close to but not equal to zero. In a preferred embodiment, $P^{L-R}$ at 96 and $P^{R-L}$ at 94 are each set to 0.

Figure 8:
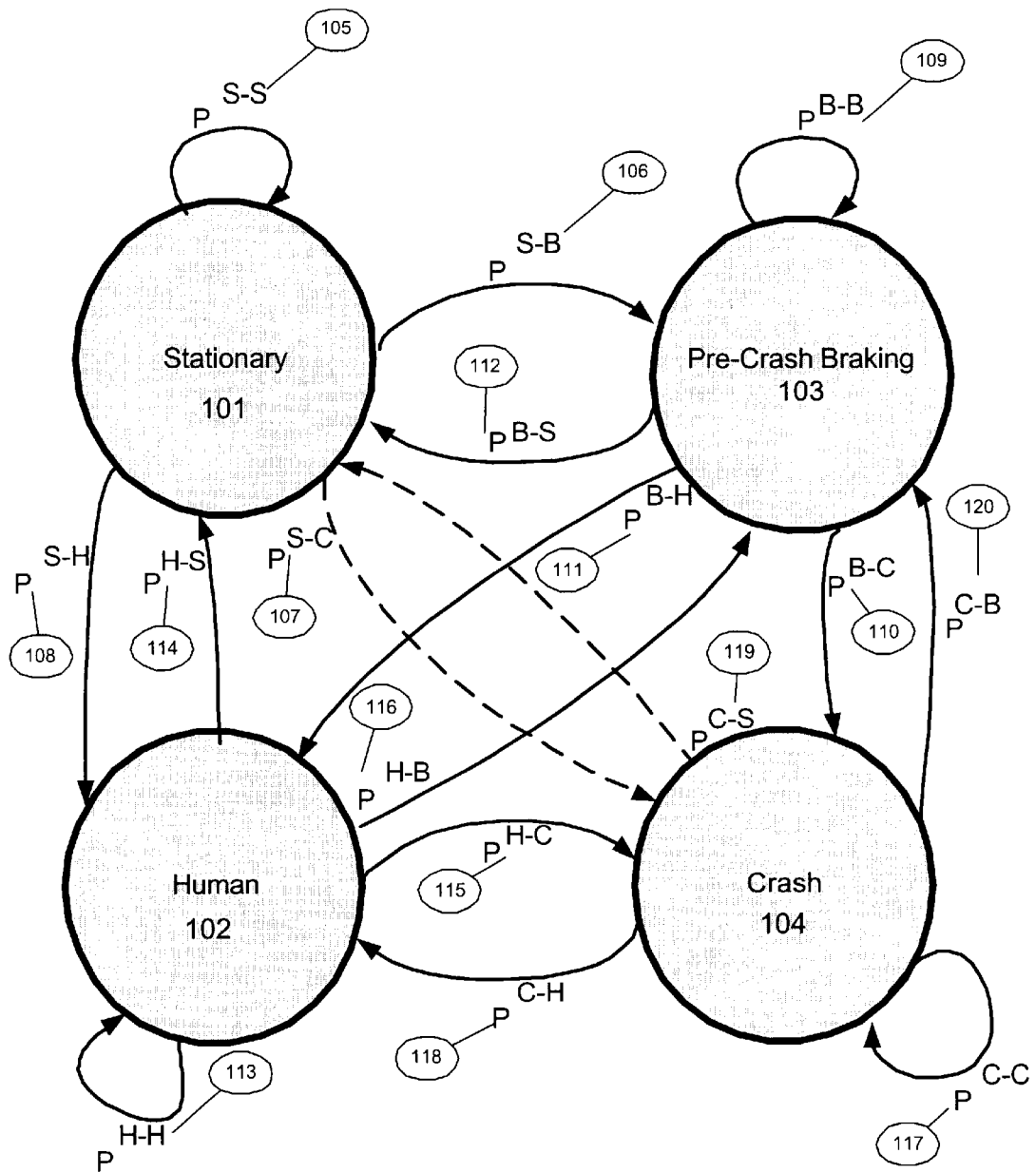
FIG. 8 shows a Markov chain of probabilities relating to a four motion mode embodiment including of human (normal), stationary (asleep), pre-crash braking, and crash modes.

FIG. 8 illustrates a similar Markov chain to represent the relevant probabilities relating to motion modes. A preferred embodiment of the system 16 uses four motion modes: a stationary mode 101, represents a human occupant 18 in a mode of stillness, such as while asleep; a human mode 102, represents a occupant 18 behaving as a typical passenger in an automobile or other vehicle, one that is moving as a matter of course, but not in an extreme way; a pre-crash braking ("braking") mode 103 represents an occupant 18 that is in a rapidly breaking vehicle; and a crash mode 104, represents the occupant 18 of a vehicle that is in a mode of crashing.

The probability of an occupant 18 being in a particular mode and then ending in a particular mode over the next increment in time can be identified by lines originating in the current state with arrows pointing to the new state. For example, the probability of an occupant in a stationary mode remaining in stationary mode $P^{S-S}$ is represented by the arrow at 105. The probability of moving from stationary to human $P^{S-H}$ is represented by the arrow at 108. The probability of moving from stationary to pre-crash braking is $P^{S-B}$ at 106 and the probability of moving from stationary to crash $P^{S-C}$ is at 107. The lines at 107 and at 119 are dotted lines solely for the purpose of distinguishing those lines from the lines at 111 and 116. The total probabilities resulting from an initial state of stationary 102 must add up to 1.

Equation 9

$$P^{S-S}+P^{S-H}+P^{S-C}+P^{S-B}=1.0$$

Similarly, the probability of a transition from human to human is $P^{H-H}$ at 113, human to stationary is $P^{H-S}$ at 114, human to crash is $P^{H-C}$ at 115, and human to pre-crash braking is $P^{H-B}$ is 116. The total probabilities resulting from an initial state of stationary 102 must add up to 1.

Equation 10

$$P^{H-H}+P^{H-C}+P^{H-S}+P^{H-B}=1.0$$

The probability of going from crash to crash is $P^{C-C}$ at 117, crash to stationary is $P^{C-S}$ at 119, crash to human is $P^{C-H}$ at 118, and crash to pre-crash braking is $P^{C-B}$ at 120. The total probabilities resulting from an initial state of crash 122 must add up to 1.

Equation 11

$$P^{C-C}+P^{C-S}+P^{C-H}+P^{C-B}=1.0$$

Lastly, the probability of going from braking to braking is $P^{B-B}$ at 109, braking to stationary is $P^{B-S}$ at 112, braking to human is $P^{B-H}$ at 111, and braking to crash is $P^{B-C}$ at 110. The total probabilities resulting from an initial state of crash 122 must add up to 1.

Equation 12

$$P^{B-B}+P^{B-S}+P^{B-H}+P^{B-C}=1.0$$

As a practical matter, it is highly unlikely (but not impossible) for an occupant 18 to ever leave the state of crash at 104 once that state has been entered. Under most scenarios, a crash at 104 ends the trip for the occupant 18. Thus, in a preferred embodiment, $P^{C-H}$, $P^{C-B}$, and $P^{C-S}$ are each set to nearly zero. It is desirable that the system 16 allow some chance of leaving a crash state 104 or else the system 16 may get stuck in a crash state 104 in cases of momentary system 16 "noise" conditions or some other unusual phenomenon. Alternative embodiments can set any particular probability with an appropriate value between 0 and 1, and a different number of modes could be used. The system 16 can incorporate a wide range of probability values which are preferably customized given the particular embodiment and environment of the system 16.

The transition probabilities associated with the various shape states and motion modes are used to generate a Kalman filter equation for each combination of characteristic and state. The results of those filters can then be aggregated in to one result, using the various probabilities to give the appropriate weight to each Kalman filter. All of the probabilities are preferably predefined by the user of the system 16.

The Markov chain probabilities provide a means to weigh the various Kalman filters for each characteristic and for each state and each mode. The tracking and predicting subsystem system 46 incorporates the markov chain probabilities in the form of two subsystems, the shape tracker and predictor 48 and the motion tracker and predictor 50.

F. Shape Tracker and Predictor

Figure 9:
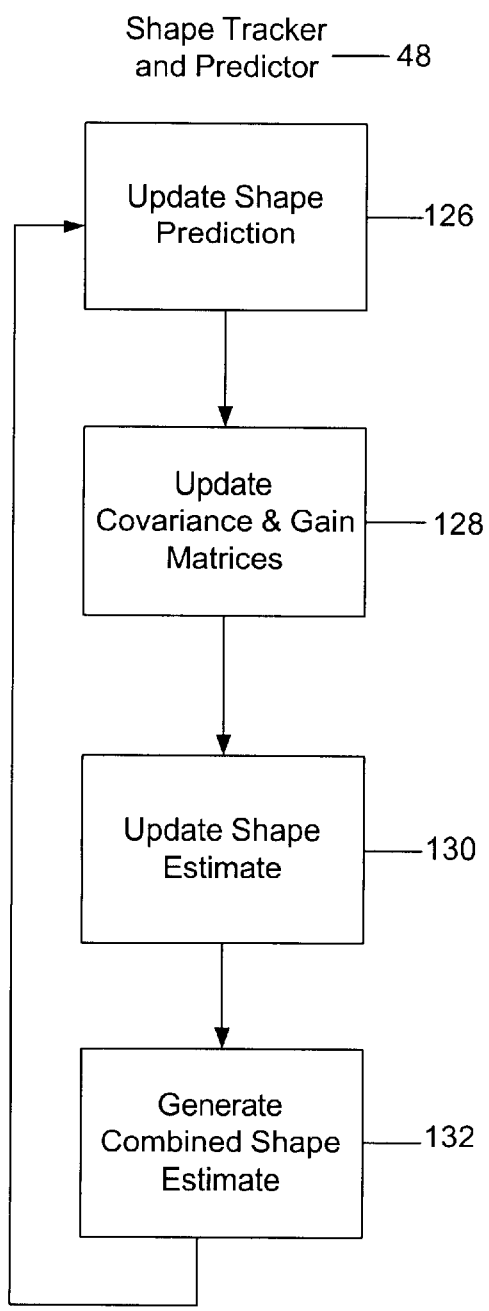
FIG. 9 shows a flowchart for measuring and predicting the shape characteristics of the occupant.

FIG. 9 discloses a detailed flow chart for the shape tracker and predictor 48. In the preferred embodiment of the invention, the shape tracker and predictor 48 tracks and predicts the major axis 64 ("major") of the upper ellipse 58, the minor axis 66 ("minor") of the upper ellipse 58, and the y-coordinate ("height") 70 of the centroid 68. Each characteristic has a vector describing position, velocity, and acceleration information for the particular characteristic. The major vector is [major, major, major], with major representing the rate of change in the major or velocity and major representing the double derivative of major (e.g. rate of change in major velocity or acceleration). Accordingly, the minor vector is [minor, minor, minor], and the height vector is [height, height, height]. Any other shape vectors will similarly have position, velocity (rate of change), and acceleration (double derivative) components.

The shape tracker and predictor 48 performs an update of shape predictions at 126, an update of covariance and gain matrices at 128, an update of shape estimates at 130, and a generation of combined shape estimates at 132. These processes are described below. The loop from 126 through 132 is perpetual while the system 16 is active. During the initial loop through the process, there is no prediction to update at 126 and there are no covariance or gain matrices to update at 128. Thus, the first loop skips to step 130. In subsequent loops, the first step in the shape tracking and prediction process 48 is an update of the shape prediction at 126. The shape tracker and predictor 48 also infers whether the occupant 18 is leaning left, leaning right, or sitting in a center-oriented posture. This information can be used to determine whether or not the occupant is in the at-risk-zone, as described in greater detail below.

1. Update Shape Prediction

An update shape prediction process is performed at 126. This process takes the last shape estimate and extrapolates that estimate into a future prediction using a transition matrix.

Equation 13

Updated Vector Prediction=Transition Matrix*Last Vector Estimate

The transition matrix applies Newtonian mechanics to the last vector estimate, projecting forward a prediction of where the occupant 18 will be on the basis of its past position, velocity, and acceleration. The last vector estimate is produced at 130 as described below.

The following equation is then applied for all shape variables and for all shape states, where x is the shape variable, $\Delta t$ represents change over time (velocity), and $\frac{1}{2}t^2$ represents acceleration.

Equation 14:

$$\text{Updated Vector Prediction} = \begin{pmatrix} 1 & \Delta t & 1/2\Delta t^2 \\ 0 & 1 & \Delta t \\ 0 & 0 & 1 \end{pmatrix} * \begin{pmatrix} (x) \\ (x) \\ (x) \end{pmatrix}$$

In a preferred embodiment of the invention, there are nine updated vector predictions at 130 because there are three shape states and three non-derived shape variables in the preferred embodiment, and 3×3=9. The updated shape vector predictions are:

Updated major for center state.
Updated major for right state.
Updated major for left state.
Updated minor for center state.
Updated minor for right state.
Updated minor for left state.
Updated height for center state.
Updated height for right state.
Updated height for left state.

2. Update Covariance and Gain Matrices

After the shape predictions are updated for all variables and all states at 126, the shape prediction covariance matrices, shape gain matrices, and shape estimate covariance matrices must be updated at 128. The shape prediction covariance accounts for error in the prediction process. The gain, as described above, represents the weight that the most recent measurement is to receive and accounts for errors in the measurement segmentation process. The shape estimate covariance accounts for error in the estimation process.

The prediction covariance is updated first. The equation to be used to update each shape prediction covariance matrix is as follows:

Equation 15

Shape Prediction Covariance Matrix=[State Transition Matrix*Old Estimate Covariance Matrix*transpose(State Transition Matrix)]+System Noise The state transition matrix is the matrix that embodies Newtonian mechanics used above to update the shape prediction. The old estimate covariance matrix is generated from the previous loop at 130. On the first loop from 126 through 132, step 128 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting noise constants is known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely solely on the past estimate instead. The role played by gain is evidenced in the basic Kalman filter equation of Equation 1.

$$X_{(new\ estimate)} = X_{(old\ prediction)} + \text{Gain}[-X_{(old\ prediction)} + X_{(measured)}]$$

The gain is not simply one number because one gain exists for each combination of shape variable and shape state. The general equation for updating the gain is Equation 16:

Gain=Shape Prediction Covariance Matrix*transpose(Measure Matrix)*$inv$(Residue Covariance)

The shape covariance matrix is calculated above. The measure matrix is simply a way of isolating and extracting the position component of a shape vector while ignoring the velocity and acceleration components for the purposes of determining the gain. The transpose of the measure matrix is simply [1 0 0]. The reason for isolating the position component of a shape variable is because velocity and acceleration are actually derived components, only position can be measured by a snapshot. Gain is concerned with the weight that should be attributed to the actual measurement.

In the general representation of a Kalman filter, $X_{(new\ estimate)} = X_{(old\ prediction)} + \text{Gain}[-X_{(old\ prediction)} + X_{(measured)}]$, the residue represents the difference between the old prediction and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 17:

Residue Covariance=[Measurement Matrix*Prediction Covariance*transpose(Measurement Matrix)]+Measurement Noise The measurement matrix is a simple matrix used to isolate the position component of a shape vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the shape estimate covariance matrix, which represents estimation error. As estimations are based on current measurements and past predictions, the estimate error will generally be less substantial than prediction error. The equation for updating the shape estimation covariance matrix is Equation 18:

Shape Estimate Covariance Matrix=(Identity Matrix−Gain Matrix*Measurement Matrix)*Shape Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a shape vector from the velocity and acceleration components. The predictor covariance matrix is also computed and described above.

3. Update Shape Estimate

An update shape estimate process is invoked at 130. The first step in this process is to compute the residue.

Equation 19

Residue=Measurement−(Measurement Matrix*Prediction Covariance)

Then the shape states themselves are updated.

Equation 20

Updated Shape Vector Estimate=Shape Vector Prediction+ (Gain*Residue)

When broken down into individual equations, the results are as follows:

$$X^C_{(major\ at\ t)} = X^C_{(major\ at\ t)} + \text{Gain}[-X^C_{(major\ at\ t-1)} + X^C_{(measured\ major)}]$$

$$X^L_{(major\ at\ t)} = X^L_{(major\ at\ t)} + \text{Gain}[-X^L_{(major\ at\ t-1)} + X^L_{(measured\ major)}]$$

$$X^R_{(major\ at\ t)} = X^R_{(major\ at\ t)} + \text{Gain}[-X^R_{(major\ at\ t-1)} + X^R_{(measured\ major)}]$$

$$X^C_{(minor\ at\ t)} = X^C_{(minor\ at\ t)} + \text{Gain}[-X^C_{(minor\ at\ t-1)} + X^C_{(measured\ minor)}]$$

-continued $$X^L_{(minor\ at\ t)} = X^L_{(minor\ at\ t)} + \text{Gain}[-X^L_{(minor\ at\ t-1)} + X^L_{(measured\ minor)}]$$

$$X^R_{(minor\ at\ t)} = X^R_{(minor\ at\ t)} + \text{Gain}[-X^R_{(minor\ at\ t-1)} + X^R_{(measured\ minor)}]$$

$$X^C_{(height\ at\ t)} = X^C_{(height\ at\ t)} + \text{Gain}[-X^C_{(height\ at\ t-1)} + X^C_{(measured\ height)}]$$

$$X^L_{(height\ at\ t)} = X^L_{(height\ at\ t)} + \text{Gain}[-X^L_{(height\ at\ t-1)} + X^L_{(measured\ height)}]$$

$$X^R_{(height\ at\ t)} = X^R_{(height\ at\ t)} + \text{Gain}[-X^R_{(height\ at\ t-1)} + X^R_{(measured\ height)}]$$

In a preferred embodiment, C represents the state of center, L represents the state of leaning left towards the driver, and R represents the state of leaning right away from the driver. The letter t represents an increment in time, with t+1 representing the increment in time immediately after t, and t−1 representing the increment in time immediately before t.

4. Generate Combined Shape Estimate

The last step in the repeating loop between steps 126 and steps 132 is a generate combined shape estimate step at 132. The first part of that process is to assign a probability to each shape vector estimate. The residue covariance is re-calculated, using the same formula as discussed above.

Equation 21

Covariance Residue Matrix=[Measurement Matrix*Prediction Covariance Matrix*transpose(Measurement Matrix)]+Measurement Noise Next, the actual likelihood for each shape vector is calculated. The system 16 determines which state the occupant is in by comparing the predicted values for the various states with the recent best estimate of what the current values for the shape variables actually are.

Equation 22:

$$\text{Likelihood}(R) \overset{(C)}{=} e^{-(residue-offset)^2/2\sigma^2}$$
$$(L)$$

There is no offset in a preferred embodiment of the system 16 because it can be assumed that offsets cancel each other out, and that the system's 16 processes can be zero-mean Gaussian signals. Sigma represents variance, and is defined in the implementation phase of the invention by a human developer. It is known in the art how to assign a useful value for sigma by looking at data.

The state with the highest likelihood determines the sideways tilt angle Φ. If the occupant 18 is in a centered state, the sideways tilt angle is 0 degrees. If the occupant 18 is tilting left, then the sideways tilt angle is −Φ. If the occupant 18 is tilting towards the right, the sideways tilt angle is Φ. In the preferred embodiment of the invention, Φ and −Φ are predefined on the basis of the type and model of vehicle using the system 16.

Next, state probabilities are updated from the likelihood generated above and the pre-defined markovian mode probabilities discussed above.

Equation 23

$$P^C = P^{C-C} + P^{R-C} + P^{L-C}$$

Equation 24

$$P^R = P^{R-R} + P^{C-R} + P^{L-R}$$

Equation 25

$$P^L = P^{L-L} + P^{C-L} + P^{R-L}$$

The equations for the updated mode probabilities are as follows, where $\mu$ represents the likelihood of a particular mode as calculated above.

Equation 26

Probability of state Left=$1/[\mu^{L*}(P^{L-L}+P^{C-L}+P^{R-L})+\mu^{R*}(P^{R-R}+P^{C-R}+P^{L-R})+\mu^{C*}(P^{C-C}+P^{R-C}+P^{L-C})]*\mu^{L*}(P^{L-L}+P^{C-L}+P^{R-L})$ Equation 27

Probability of state Right=$1/[\mu^{L*}(P^{L-L}+P^{C-L}+P^{R-L})+\mu^{R*}(P^{R-R}+P^{C-R}+P^{L-R})+\mu^{C*}(P^{C-C}+P^{R-C}+P^{L-C})]*\mu^{R*}(P^{R-R}+P^{C-R}+P^{L-R})$ Equation 28

Probability of state Center=$1/[\mu^{L*}(P^{L-L}+P^{C-L}+P^{R-L})+\mu^{R*}(P^{R-R}+P^{C-R}+P^{L-R})+\mu^{C*}(P^{C-C}+P^{R-C}+P^{L-C})]*\mu^{C*}(P^{C-C}+P^{L-C}+P^{R-C})$ The combined shape estimate is ultimately calculated by using each of the above probabilities, in conjunction with the various shape vector estimates. As discussed above, $P^{R-L}$ and $P^{R-L}$ are set at 0 in a preferred embodiment.

Equation 29:

$X$ = Probability of state Left $* X^{Left}$ +

Probability of state Right $* X^{Right}$ +

Probability of state Center $* X^{Center}$

X is any of the shape variables, including a velocity or acceleration derivation of a measured value.

The loop from 126 through 132 repeats continuously while the vehicle is in operation or while there is an occupant 18 in the seat 20. The process at 126 requires that an estimate be previously generated at 130, and the process at 128 requires the existence of covariance and gain matrices to update, so processing at 126 and 128 is not invoked the first time through the repeating loop from 126 through 132.

G. Motion Tracker and Predictor

Figure 10:
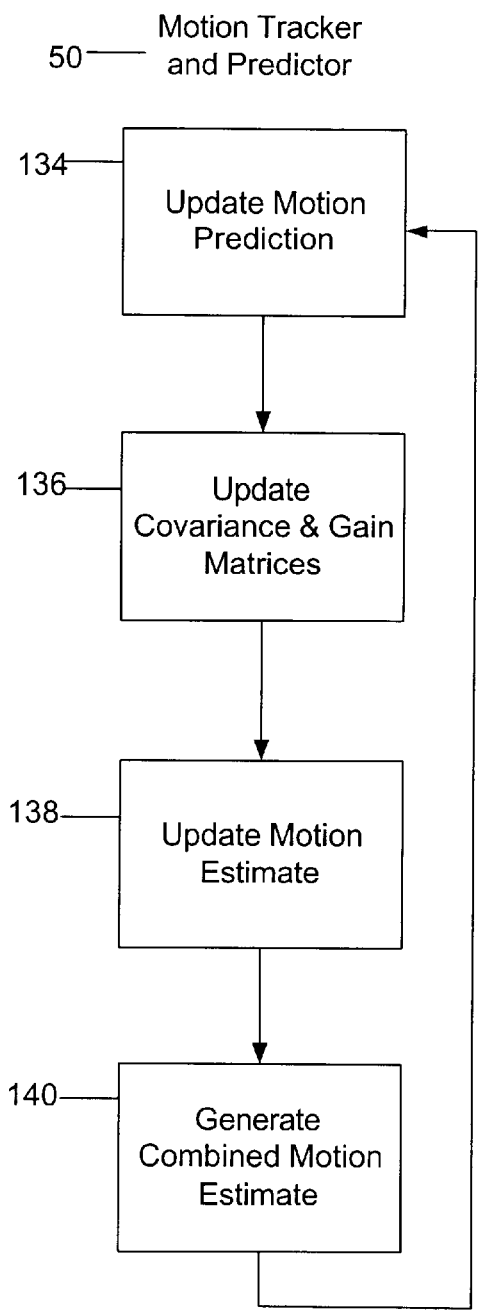
FIG. 10 shows a flowchart for measuring and predicting the motion characteristics of the occupant.

The motion tracker and predictor 50 in FIG. 10 functions similarly in many respects, to the shape tracker and predictor 48 in FIG. 9. The motion tracker and predictor 50 tracks different characteristics and vectors than the shape tracker. In the preferred embodiment of the invention, the x-coordinate 60 of the centroid 68 and the forward tilt angle θ 62, and their corresponding velocities and accelerations (collectively "motion variables" or "motion characteristics") are tracked and predicted. The x-coordinate 60 of the centroid 68 is used to determine the distance between the occupant 18 and a location within the automobile such as the instrument panel 34, the airbag deployment system 36, or some other location in the automobile. In the preferred embodiment, the instrument panel 34 is used since that is where the airbag is generally deployed from.

The x-coordinate vector includes a position component (x), a velocity component (x), and an acceleration component (x). The θ vector similarly includes a position component (θ), a velocity component (θ), and an acceleration component (θ). Any other motion vectors will similarly have position, velocity, and acceleration components.

The motion tracker and predictor subsystem 50 performs an update motion prediction at 134, an update covariance and gain matrices step at 136, an update motion estimate at 138, and a generate combined motion estimate step at 130. The loop from 134 through 140 mirrors in many respects the loop from 126 through 132. During the first loop through the motion tracker and predictor 50, there is not motion prediction to update at 134 and no covariance or gain matrices to update at 136. Thus, the initial loop begins at 138.

1. Update Motion Prediction

An update motion prediction process is performed at 134. This process takes the last motion estimate and extrapolates that estimate into a future prediction using a transition matrix as disclosed in Equation 13:

Updated Vector Prediction=Transition Matrix*Last Vector Estimate

The transition matrix applies Newtonian mechanics to the last vector estimate, projecting forward a prediction of where the occupant 18 will be on the basis of its past position, velocity, and acceleration. The last vector estimate is produced at 138 as described below. The process from 134 to 136, from 136 to 138, and from 138 to 140, loops back to 134. The process at 134 requires that an estimate be previously generated at 138, so processing at 134 and 136 is not invoked the first time through the repeating loop that is steps 134–140.

Equation 14 is then applied for all motion variables and for all motion modes:

$$\text{Updated Vector Prediction} = \begin{pmatrix} 1 & \Delta t & 1/2\Delta t^2 \\ 0 & 1 & \Delta t \\ 0 & 0 & 1 \end{pmatrix} * \begin{pmatrix} x \\ x' \\ x'' \end{pmatrix}$$

In the preferred embodiment of the invention, there would be eight updated vector predictions at 134 because there are four motion modes and two motion variables in the preferred embodiment, and 4×2=8. The updated motion predictions are:

Updated x-coordinate for crash mode.

Updated x-coordinate for pre-braking crash mode.

Updated x-coordinate for human mode.

Updated x-coordinate for stationary mode.

Updated θ for crash mode.

Updated θ for pre-crash braking mode.

Updated θ for human mode.

Updated θ for stationary mode.

2. Update Covariance and Gain Matrices

After the motion predictions are updated for all motion variables and all modes at 134, the motion prediction covariance matrices, motion gain matrices, and motion estimate covariance matrices must be updated at 136. The motion prediction covariance accounts for error in the prediction process. The gain, as described above, represents the weight that the most recent measurement is to receive and accounts for errors in the measurement and segmentation process. The motion estimate covariance accounts for error in the estimation process.

The prediction covariance is updated first. Equation 30 is used to update each motion prediction covariance matrix.

Equation 30

Motion Prediction Covariance Matrix=State Transition Matrix*Old Estimate Covariance Matrix*transpose(State Transition Matrix)+System Noise The state transition matrix is the matrix that embodies Newtonian mechanics used above to update the motion prediction. The old estimate covariance matrix is generated from the previous loop at 136. On the first loop from 134 through 140, step 134 is skipped. Taking the transpose of a matrix is simply the switching of rows with columns and columns with rows, and is known under the art. Thus, the transpose of the state transition matrix is the state transition matrix with the rows as columns and the columns as rows. System noise is a matrix of constants used to incorporate the idea of noise in the system. The constants used in the system noise matrix are set by the user of the invention, but the practice of selecting such constants are known in the art.

The next matrix to be updated is the gain matrix. As discussed above, the gain represents the confidence of weight that a new measurement should be given. A gain of one indicates the most accurate of measurements, where past estimates may be ignored. A gain of zero indicates the least accurate of measurements, where the most recent measurement is to be ignored and the user of the invention is to rely on the past estimate instead. The role played by gain is evidenced in the basic Kalman filter equation in Equation 1 where $$X_{(new\ estimate)} = X_{(old\ prediction)} + \text{Gain}[-X_{(old\ prediction)} + X_{(measured)}]$$

The gain is not simply one number but an entire matrix because one gain exists for each combination of motion variable and motion mode. The general equation for updating the gain is Equation 31:

Gain=Motion Prediction Covariance Matrix*transpose(Measure Matrix)*inv(Residue Covariance)

The motion covariance matrix is calculated above. The measure matrix is simply a way of isolating and extracting the position component of a motion vector while ignoring the velocity and acceleration components for the purposes of determining the gain. The transpose of the measure matrix is simply [1 0 0]. The reason for isolating the position component of a motion variable is because velocity and acceleration are actually derived components. Position is the only component actually measured, and because gain is concerned with the weight that should be attributed to the actual measurement, derived variables should be isolated.

In the general representation of a Kalman filter, $X_{(new\ estimate)} = X_{(old\ prediction)} + \text{Gain}[-X_{(old\ prediction)} + X_{(measured)}]$, the residue represents the difference between the old estimate and the new measurement. There are entire matrices of residue covariances. The inverse of the residue covariance matrix is used to update the gain matrix. It is known in the art how to take the inverse of a matrix, which is a simple linear algebra process. The equation for residue covariance matrix is Equation 17 as disclosed above:

Residue Covariance=[Measurement Matrix*Prediction Covariance*transpose(Measurement Matrix)]+Measurement Noise The measurement matrix is a simple matrix used to isolate the position component of a motion vector from the velocity and acceleration components. The prediction covariance is calculated above. The transpose of the measurement matrix is simply a one row matrix of [1 0 0] instead of a one column matrix with the same values. Measurement noise is a constant used to incorporate error associated with the sensor 22 and the segmentation process 40.

The last matrix to be updated is the motion estimate covariance matrix, which represents estimation error. As estimations are based on current measurements and past predictions, the estimate error will generally be less substantial than the prediction error. The equation for updating the motion estimation covariance matrix is Equation 32:

Motion Estimate Covariance Matrix=(Identity Matrix–Gain Matrix*Measurement Matrix)*Motion Predictor Covariance Matrix An identity matrix is known in the art, and consists merely of a diagonal line of 1's going from top left to bottom right, with zeros at every other location. The gain matrix is computed and described above. The measure matrix is also described above, and is used to isolate the position component of a motion vector from the velocity and acceleration components. The predictor covariance matrix is also computed and described above.

3. Update Motion Estimate

An update motion estimate process is invoked at 138. The first step in this process is to compute the residue using Equation 19:

Residue=Measurement–(Measurement Matrix*Prediction Covariance)

Then the motion states themselves are updated.

Equation 33

Motion Vector Estimate=Motion Vector Prediction+(Gain*Residue)

When broken down into individual equations, the results are as follows:

$$X^H_{(x\text{-coordinate at }t)} = X^H_{(x\text{-coordinate at }t)} +$$
$$\text{Gain}\left[-X^H_{(x\text{-coordinate at }t-1)} + X^H_{(measured\ x\text{-coordinate})}\right]$$

$$X^S_{(x\text{-coordinate at }t)} = X^S_{(x\text{-coordinate at }t)} +$$
$$\text{Gain}\left[-X^S_{(x\text{-coordinate at }t-1)} + X^S_{(measured\ x\text{-coordinate})}\right]$$

$$X^C_{(x\text{-coordinate at }t)} = X^C_{(x\text{-coordinate at }t)} +$$
$$\text{Gain}\left[-X^C_{(x\text{-coordinate at }t-1)} + X^C_{(measured\ x\text{-coordinate})}\right]$$

$$X^B_{(x\text{-coordinate at }t)} = X^B_{(x\text{-coordinate at }t)} +$$
$$\text{Gain}\left[-X^B_{(x\text{-coordinate at }t-1)} + X^B_{(measured\ x\text{-coordinate})}\right]$$

$$X^H_{(\theta\ at\ t)} = X^H_{(\theta\ at\ t)} + \text{Gain}[-X^H_{(\theta\ at\ t-1)} + X^H_{(measured\ \theta)}]$$
$$X^S_{(\theta\ at\ t)} = X^S_{(\theta\ at\ t)} + \text{Gain}[-X^S_{(\theta\ at\ t-1)} + X^S_{(measured\ \theta)}]$$
$$X^C_{(\theta\ at\ t)} = X^C_{(\theta\ at\ t-1)} + \text{Gain}[-X^C_{(\theta\ at\ t-1)} + X^C_{(measured\ \theta)}]$$
$$X^B_{(\theta\ at\ t)} = X^B_{(\theta\ at\ t-1)} + \text{Gain}[-X^B_{(\theta\ at\ t-1)} + X^B_{(measured\ \theta)}]$$

In a preferred embodiment, H represents the mode of human, C represents the mode of crash, S represents the mode of stationary, and B represents pre-crash braking. The letter represents an increment of time, with t+1 occurring on increment subsequent to t and t−1 occurring one unit or increment before t. Alternative embodiments can have a wide range of different motion modes.

4. Generate Combined Motion Estimate

The last step in the repeating loop between steps 134 and steps 140 is a generate combined motion estimate step at 140. The first part of that process is to assign a probability to each motion vector estimate. The residue covariance is re-calculated, using Equation 21 as discussed above.

Covariance Residue Matrix=[Measurement Matrix*Prediction Covariance Matrix*transpose(Measurement Matrix)]+Measurement Noise Next, the actual likelihood for each motion vector is calculated.

Equation 34:

$$\text{Likelihood}\begin{matrix}(C)\\(H)\\(S)\\(B)\end{matrix} = e^{-(residue-offset)^2/2\sigma^2}$$

There is no offset in a preferred embodiment of the invention because it can be assumed that offsets cancel each other out, and that the system's 16 processes can be zero-mean Gaussian signals. Sigma represents variance, and is defined in the implementation phase of the invention by a human developer. It is known in the art how to assign a useful value for sigma by looking at data.

Next, mode probabilities are updated from the likelihood generated above and the pre-defined markovian mode probabilities discussed above.

Equation 35

$$P^C = P^{C-C} + P^{S-C} + P^{H-C} + P^{B-C}$$

Equation 36

$$P^H = P^{H-H} + P^{S-H} + P^{C-H} + P^{B-H}$$

Equation 37

$$P^S = P^{S-S} + P^{H-S} + P^{C-S} + P^{B-S}$$

Equation 38

$$P^B = P^{B-B} + P^{H-B} + P^{C-B} + P^{H-B}$$

The equations for the updated mode probabilities are as follows, where $\mu$ represents the likelihood of a particular mode as calculated above:

Equation 39:

$$\text{Probability of mode Stationary} = 1/[\mu^S*(P^{S-S}+P^{H-S}+P^{C-S}+P^{B-S})+$$
$$\mu^H*(P^{H-H}+P^{S-H}+P^{C-H}+P^{B-H})+$$
$$\mu^C*(P^{C-C}+P^{S-C}+P^{H-C}+P^{B-C})+$$
$$\mu^B*(P^{B-B}+P^{S-B}+P^{H-B}+P^{C-B})]*$$
$$\mu^S*(P^{S-S}+P^{H-S}+P^{C-S}+P^{B-S})$$

Equation 40:

$$\text{Probability of mode Human} = 1/[\mu^S*(P^{S-S}+P^{H-S}+P^{C-S}+P^{B-S})+$$
$$\mu^H*(P^{H-H}+P^{S-H}+P^{C-H}+P^{B-H})+$$
$$\mu^C*(P^{C-C}+P^{S-C}+P^{H-C}+P^{B-C})+$$
$$\mu^B*(P^{B-B}+P^{S-B}+P^{H-B}+P^{C-B})]*$$
$$\mu^H*(P^{H-H}+P^{S-H}+P^{C-H}+P^{B-H})$$

Equation 41:

$$\text{Probability of mode Crash} = 1/[\mu^S*(P^{S-S}+P^{H-S}+P^{C-S}+P^{B-S})+$$
$$\mu^H*(P^{H-H}+P^{S-H}+P^{C-H}+P^{B-H})+$$
$$\mu^C*(P^{C-C}+P^{S-C}+P^{H-C}+P^{B-C})+$$
$$\mu^B*(P^{B-B}+P^{S-B}+P^{H-B}+P^{C-B})]*$$
$$\mu^C*(P^{C-C}+P^{S-C}+P^{H-C}+P^{B-C})$$

Equation 42:

$$\text{Probability of mode Braking} = 1/[\mu^S*(P^{S-S}+P^{H-S}+P^{C-S}+P^{B-S})+$$
$$\mu^H*(P^{H-H}+P^{S-H}+P^{C-H}+P^{B-H})+$$
$$\mu^C*(P^{C-C}+P^{S-C}+P^{H-C}+P^{B-C})+$$
$$\mu^B*(P^{B-B}+P^{S-B}+P^{H-B}+P^{C-B})]*$$
$$\mu^B*(P^{C-B}+P^{S-B}+P^{H-B}+P^{B-B})$$

The combined motion estimate is ultimately calculated by using each of the above probabilities, in conjunction with the various motion vector estimates.

*Equation 43:*

$$X = \text{Probability of mode Human}*X^{Human}$$
$$+\text{Probability of mode Crash}*X^{Crash}$$
$$+\text{Probability of mode Stationary}*X^{Stationary}$$
$$+\text{Probability of mode Stationary}*X^{Braking}$$

X is any of the motion variables, including a velocity or acceleration derivation.

The loop from 134 through 140 repeats continuously while the vehicle is in operation or while there is an occupant 18 in the seat 20.

G. Crash Detection Subsystem

In a preferred embodiment of the system 16, the crash detection subsystem 51 uses the double derivatives (e.g. acceleration in Newtonian mechanics) of occupant characteristics generated by the tracking and predicting subsystem 46 to determine if a crash justifying the deployment of an airbag 36 has occurred. Preferably, the outputs of both the shape tracker and predictor 48 and the motion tracker and predictor 50 are incorporated into the crash determination. Such a system 16 can also incorporate other occupant characteristics and derivatives of those characteristic. The system 16 can be configured in a wide variety of different ways, focusing on different occupant characteristics, groups of characteristics, and inter-relationships between occupant characteristics.

In a preferred embodiment, the crash determination subsystem 51 generates crash determinations by comparing occupant characteristics with corresponding template measurement values associated with the various motion modes or shape states. For example, the stationary mode 101 shown in FIG. 8, is typically associated with a low acceleration of about approximately 0 G, where 1.0 G represents the magnitude of acceleration caused by the earth's gravitational field. The human mode 102 is typically associated with an acceleration of about approximately 0.1G. The pre-crash braking mode 103 is typically associated with acceleration of about approximately 1.0 G. The crash mode 104 is typically associated with acceleration of about between 2–20 G. In alternative embodiments, motion modes can be associated with different ranges of acceleration, making the system 16 either more or less conservative with respect to identifying a collision. The system 16 can focus on a single acceleration variable (such as acceleration of the centroid 68) or the system 16 can create a weighted average of acceleration characteristics which are compared to the acceleration values associated with the various motion modes. Alternative embodiments of the system 16 can also incorporate fewer modes, a greater number of modes, or motion modes different from crashing 104, braking 103, stationary 101, and human 102.

Alternative embodiments can also utilize different occupant 18 characteristics outputted from the tracking and predicting subsystem 46. Some alternative embodiments can utilize solely shape characteristics, while other alternative embodiments can utilize solely motion characteristics. The system 16 can focus on the double derivative of a single occupant characteristic such as acceleration of the centroid 68. Alternatively, the system 16 can incorporate a broader range of occupant characteristics that include single derivatives and non-derivative values of occupant measurements. If the system 16 is set to focus on only one occupant characteristic in making a crash determination, that characteristic is preferably the acceleration of the centroid 68 of the upper ellipse 58. Double derivatives (e.g. acceleration) of other occupant characteristics can also be used by the system 16. A preferable acceleration to be used by the system is a "future acceleration" which relates to the time in the future when the airbag is to actually be deployed. The use of Kalman filters in the tracking and predicting subsystem 46 allows the crash detection subsystem 51 to generate crash determinations at a rate that is faster than the camera or sensor 22 used to capture occupant 18 measurements. The use of multiple model Kalman filters by the system 16 allows the crash detection subsystem 51 to generate probability-weighted acceleration determinations for the occupant 16.

In alternative embodiments, occupant 18 characteristics not relating to the double derivatives of measured variables can play a prominent part in a crash determination by the system 16. For example, a crash determination by the system 16 can be identified by analyzing the large change in position rather than using acceleration per se as the determining factor.

Crash detection in alternative embodiments can also be based on the results of Equation 34. If the probability of a crash exceeds a certain threshold value, the system 16 can be configured to treat the situation as a crash without looking to an occupant characteristic.

H. At-Risk-Zone Subsystem

In a preferred embodiment of the system 16, the At-Risk-Zone ("ARZ") subsystem 53 or ARZ indicator takes the outputs of the shape tracker and predictor 48 and the motion tracker and predictor 50, and determines if the occupant 18 is in the ARZ or will be within the At-Risk-Zone ("ARZ") at the time in which an airbag 36 is to deploy. The ARZ is an area or distance predefined (with respect to the particular vehicle incorporating the system 16) in which the occupant 18 is too close to the airbag 36 to allow safe deployment of the airbag 36. This calculation can utilize any of the motion or shape variables, or even characteristics that are not shape or motion variables. In a preferred embodiment, the ARZ subsystem 53 determines whether or not the closest point on the upper ellipse 58 is within the predefined ARZ. Alternative embodiments can use different points on the upper ellipse 58 or occupant 18. The ARZ is preferably defined by taking into consideration the specific environment presented by a particular type of automobile or vehicle. The ARZ Subsystem 53 can also determine whether or not the occupant 18 is leaning so far to the driver side of the automobile, that the occupant 18 is not within the ARZ. ARZ calculations are updated very quickly using the outputted state transition matrix which allows the system 16 to predict the position and shape in advance, and at a rate more quickly than the rate in which the sensor 22 collects data.

I. Impact Assessment Subsystem

The impact assessment subsystem 55 uses the shape and motion variables discussed above to generate a impact metric representing the impact of the occupant 18 colliding with the airbag 36 that the airbag 36 needs to absorb. In a preferred embodiment, kinetic energy is the impact metric. In alternative embodiments, momentum, or a weighted combination of kinetic energy and momentum can be used as the impact metric. Alternative embodiments can also utilize any impact metric that incorporates characteristics of the occupant 18, such as mass, velocity, or any of the other motion or shape variables, including any characteristics that could be derived from a motion or shape variable.

1. Mass

As disclosed in Equation 4, mass is preferably used to compute the impact metric of kinetic energy. The density of a human occupant 18 is relatively constant across broad spectrum of potential human occupants 18. The average density of a human occupant 18 is known in the art as anthropomorphic data that can be obtained from NHTSA (National Highway Traffic Safety Administration) or the IIA (Insurance Institute of America). Thus, the mass of an occupant 18 is substantially a function of volume as set forth in Equation 5 above.

In a preferred embodiment, the system 16 determines whether or not the occupant 18 is restrained by a seat belt. This is done in by comparing the velocity (x') of the occupant 18 with the rate of change (e.g. velocity) in the forward tilt angle ($\theta$') 62. If the occupant 18 is restrained by a seat belt, the rate of change in the forward tilt angle 62 should be roughly two times the velocity of the occupant 18. In contrast, for an unbelted occupant 18, the ratio of $\theta'/x'$ will be roughly zero, because there will be an insignificant change in the forward tilt angle for an unbelted occupant 18. If an occupant 18 is restrained by a functional seatbelt, the mass of the occupant's 18 lower torso should not be included in the impact metric of the occupant 18 because the mass of the lower torso is restrained by a seat belt, and thus will not need to be constrained by the airbag deployment system 36. If the occupant 18 is not restrained by a seatbelt, the mass of the lower torso needs to be included in the mass of the occupant 18. Across the broad spectrum of potential human occupants 18, the upper torso is consistently between 65% and 68% of the total mass of a human occupant 18. If the occupant 18 is not restrained by a seat belt in a preferred embodiment, the mass of both the occupant 18 (including the lower torso) is calculated by taking the mass of the upper torso and dividing that mass by a number between 0.65 and 0.68. A preferred embodiment does not require the direct calculation of the volume or mass of the lower ellipse 56.

The volume of an ellipsoid is well known in the art.

Equation 44

$$Volume = 4/3 * \pi * major * minor_1 * minor_2$$

Major is the major axis 64. Minor$_1$ is the minor axis 66. Minor$_2$ is the minor axis that is not visible in FIG. 5 because it is in the z-axis of FIG. 5, and represents the "width" of the ellipsoid, or the shoulder-span of the occupant 18. The two-dimensional ellipse 58 is known to be a projection from a particular angle and therefore allows the system 16 to decide what the three-dimensional ellipsoid should be. In a preferred embodiment, the "width" of the ellipsoid is capped at the width of the vehicle seat 20 in which the occupant 18 sits. The width of the vehicle seat 20 can be easily measured for any vehicle before the system 16 is incorporated for use is a vehicle of line of vehicles.

Minor$_2$ can be derived from the major axis 64 and the minor axis 66. Anthropomorphic data from NHTSA or the Insurance Institute of America is used to create electronic "look-up" tables deriving the z-axis information from the major axis 64 and minor axis 66 values. FIG. 11a illustrates the format of a "look-up" table that could be electronically stored in the system 16. The inputs of a major axis value 64 and a minor axis value 66 are used to derive the z-axis value ("occupant width"), which can then be used to calculate volume using Equation 44, and then mass using Equation 5.

FIG. 11b illustrates a "look-up" table where Equation 44 is incorporated directly into output listing. Inputting the major 64 and minor 66 axis values results in the output of volume rather than merely the z-axis value because the operations of Equation 44 are already performed on the z-axis value. The output in FIG. 11b requires the subsequent application of Equation 5.

FIG. 11c illustrates a preferred embodiment of the "look-up" table where both Equations 44 and 5 are incorporated into the output column, and thus the system 16 inputs the major 64 and minor 66 axis values, while outputting the mass of the occupant 18. If an embodiment uses kinetic energy as the impact metric, the table in FIG. 11c is preferable to the tables in FIGS. 11a and 11b because mass is one of two variables needed to calculate kinetic energy. The second variable of Equation 4 is velocity.

2. Velocity

Velocity is a motion characteristic derived from differences in occupant 18 position as described by Newtonian mechanics and as described in greater detail above. The relevant measure of occupant 18 velocity is the moment of impact between the occupant 18 and the airbag 36. The movement of the airbag 36 towards the occupant 18 is factored into this analysis in the preferred embodiment of the system 16.

In a preferred embodiment of the system 16, the kinetic energy of the occupant 18 equals the kinetic energy of the deploying airbag 36.

Equation 46

$$Velocity_{occupant} \delta t = Velocity_{airbag} \delta t$$

3. Additional Alternative Variations and Embodiments

The underlying calculations of motion and shape variables are updated very quickly using the outputted state transition matrix described above which allows the system 16 to predict the position and shape in advance, and at a rate more quickly than the rate in which the sensor 22 collects data. The impact metric prediction is thus similarly updated at a quicker rate than the rate in which the sensor 22 collects data. In alternative embodiments of the invention that classify the occupant 18 into different occupant types, each occupant type could have a distinct density.

Alternative embodiments can also incorporate other occupant 18 characteristics. For example, momentum can be substituted for kinetic energy as a proxy for the desirable strength of an airbag deployment. Other potential impact metrics include momentum, a weighted combination of momentum and kinetic energy, or potentially any other metric utilizing mass or velocity.

The impact assessment subsystem 55 can provide the airbag controller 32 with the appropriate information relating to airbag 36 deployment. In a preferred embodiment, the airbag 36 can be deployed at partial strengths, such as 25%, 50%, and 75% as well as at 0% and 100%.

In accordance with the provisions of the patent statutes, the principles and modes of operation of this invention have been explained and illustrated in multiple preferred and alternative embodiments. However, it must be understood that this invention may be practiced otherwise than is specifically explained and illustrated without departing from its spirit or scope.

What is claimed is:

1. An image processing system for use with an airbag deployment system having a seat, an occupant in the seat, a sensor for generating sensor readings, an airbag, and an airbag controller, said image processing system comprising:

a segmented image of the occupant obtained from the sensor reading;

a tracking and predicting subsystem, including an occupant characteristic prediction, said tracking and predicting subsystem identifying said occupant characteristic prediction at least in part from said segmented image; and a crash detection subsystem, including a crash determination, said crash detection subsystem generating said crash determination from said occupant characteristic prediction.

2. An image processing system as in claim 1, wherein said occupant characteristic prediction is an acceleration of the occupant.

3. An image processing system as in claim 2, wherein said acceleration of the occupant characteristic prediction is a future acceleration of the occupant.

4. An image processing system as in claim 2, wherein said acceleration of the occupant is a probability-weighted acceleration of the occupant.

5. An image processing system as in claim 1, wherein said crash determination is generated at a quicker rate then the rate at which the sensor generates sensor readings.

6. An image processing system as in claim 1, further comprising an ellipse fitting subsystem, an ellipse, and an ellipse characteristic, said ellipse fitting subsystem generating said ellipse from said segmented image, and wherein said occupant characteristic prediction is said ellipse characteristic.

7. An image processing system as in claim 1, said tracking and predicting subsystem further including an iterative tracking and predicting heuristic for generating said occupant characteristic prediction.

8. An image processing system as in claim 7, said iterative tracking and predicting heuristic comprising a Kalman filter, said Kalman filter generating said occupant characteristic prediction.

9. An image processing system as in claim 1, further comprising a plurality of motion models and a probability-weighted calculation, wherein said crash determination is generated by performing said probability-weighted calculation on said occupant characteristic for each motion model in said plurality of motion models.

10. An image processing system as in claim 1, further comprising an impact assessment subsystem and an impact metric, said impact assessment subsystem generating said impact metric from said occupant characteristic prediction.

11. An image processing system as in claim 10, wherein a kinetic energy prediction is said impact metric.

12. An image processing system as in claim 11, wherein said impact metric relates to a point in time when the occupant impacts into the deploying airbag.

13. An image processing system as in claim 10, further comprising an airbag deployment subsystem and a deployment strength, said airbag deployment subsystem determining said deployment strength from said impact metric.

14. An image processing system as in claim 13, further comprising a seat belt status, said airbag deployment subsystem incorporating said seat belt status into the determination of said deployment strength.

15. An image processing system as in claim 1, further including a plurality of occupant characteristics comprising:
   a location; and
   one said occupant characteristic selected from the group including:
     a velocity;
     an acceleration;
     a mass;
     a volume;
     an area; and
     an axis of a three-dimensional environment.

16. An image processing system for use with an airbag deployment system having a seat, an occupant in the seat, a sensor for generating sensor readings, an airbag, and an airbag controller, said image processing system comprising:
   a segmented image of the occupant obtained from the sensor reading;
   a tracking and predicting subsystem, including an occupant characteristic, said tracking and predicting subsystem identifying said occupant characteristic from said segmented image, said tracking and predicting subsystem further including:
     a plurality of occupant characteristics, comprising a plurality of shape characteristics and a plurality of motion characteristics,
     a motion tracker and predictor for tracking and predicting said plurality of motion characteristics, and
     a shape tracker and predictor for tracking and predicting said plurality of shape characteristics, wherein said occupant characteristic is generated from at least one said motion characteristic and at least one said shape characteristic; and
   a crash detection subsystem, including a crash determination, said crash detection subsystem generating said crash determination from said occupant characteristic.

17. An image processing system as in claim 16, wherein said shape characteristics include:
   a height of the occupant; and
   a shape of the upper torso of the occupant.

18. An image processing system as in claim 17, including a plurality of predefined motion modes, wherein said motion tracker and predictor utilizes said plurality of predefined motion modes.

19. An image processing system as in claim 18, wherein said predefined motion modes comprise:
   a mode of crashing;
   a mode of pre-crash braking;
   a mode of being stationary; and
   a mode of being human.

20. An image processing system as in claim 16, wherein said motion characteristics include:
   a distance between the occupant and the airbag; and
   a forward tilt angle.

21. An image processing system as in claim 16, including a plurality of predefined shape states, wherein said shape tracker and predictor uses said plurality of predefined shape states.

22. An image processing system as in claim 21, wherein said predefined shape states comprise:
   a state of leaning left;
   a state of leaning right; and
   a state of sitting generally centered.

23. An image classification system as in claim 16, wherein said shape tracker and predictor comprises:
   an update shape predictor;
   an update covariance and gain matrices generator;
   an update shape estimator; and
   a combined shape estimate generator.

24. An image classification system as in claim 16, wherein said motion tracker and predictor comprises:
   an update motion predictor;
   an update covariance and gain matrices generator;
   an update motion estimator; and
   a combined motion estimate generator.

25. An image processing system for use with an airbag deployment system having a seat, an occupant in the seat, a sensor for capturing ambient images, an airbag, an airbag controller, said image processing system comprising:
   a segmentation subsystem, including an ambient image and a segmented image, said segmentation subsystem generating said segmented image from said ambient image;
   an ellipse fitting subsystem, including an ellipse, said ellipse fitting subsystem generating said ellipse from said segmented image;
   a tracking and predicting subsystem, including a plurality of occupant characteristics, said tracking an predicting subsystem generating said plurality of occupant characteristics from said ellipse; and a crash detection subsystem, including a crash determination, said crash detection subsystem generating said crash determination from said plurality of occupant characteristics.

26. An image processing system as in claim 25, further comprising a plurality of motion models and a probability-weighted calculation, wherein said crash determination is generated by performing said probability-weighted calculation on said plurality of occupant characteristics for each motion model in said plurality of motion models.

27. An image processing system as in claim 25, said tracking and predicting subsystem further including a plurality of past predictions, wherein said plurality of past predictions are incorporated into said plurality of occupant characteristics.

28. An image processing system as recited in claim 27, said tracking and predicting subsystem applying a plurality of Kalman filters to incorporate said plurality of past predictions into said plurality of occupant characteristics.

29. A method for detecting a vehicle collision by evaluating characteristics of the occupant in the vehicle, comprising the steps of:
 isolating a segmented image of the occupant;
 applying a plurality of mathematical heuristics to the segmented image of the occupant to generate a plurality of characteristics relating to the occupant; and
 determining which of a plurality of motion models best describes said plurality of characteristics.

30. A method for detecting a vehicle collision as in claim 29, further comprising creating an ellipse to represent the upper torso of the segmented image, wherein said plurality of characteristics are derived from said ellipse.

31. A method for detecting a vehicle collision as in claim 29, wherein said plurality of motion models include at least a subset of a stationary mode, a human mode, a pre-crash braking mode, and a crash mode.

32. A method for detecting a vehicle collision as in claim 29, wherein determining which of a plurality of motion models best describes said plurality of occupant characteristics comprises comparing at least one said occupant characteristic with a corresponding motion model characteristic.

33. A method for detecting a vehicle collision as in claim 29, wherein said plurality of mathematical heuristics includes a Kalman filter.

34. A method for detecting a vehicle collision as in claim 33, wherein said Kalman filter is a interacting multiple model implementation Kalman filter.

35. An image processing system as in claim 1, wherein said tracking and predicting subsystem identifies said occupant characteristic prediction from said segmented image and a prior occupant characteristic prediction.

* * * * *